(12) United States Patent
Wang et al.

(10) Patent No.: US 10,700,769 B2
(45) Date of Patent: Jun. 30, 2020

(54) SATELLITE-BASED NARROW-BAND COMMUNICATION

(71) Applicant: Google LLC, Mountain View, CA (US)

(72) Inventors: Jibing Wang, Saratoga, CA (US); Erik Richard Stauffer, Sunnyvale, CA (US); Aamir Akram, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/142,952

(22) Filed: Sep. 26, 2018

(65) Prior Publication Data

US 2019/0190591 A1 Jun. 20, 2019

Related U.S. Application Data

(60) Provisional application No. 62/599,522, filed on Dec. 15, 2017.

(51) Int. Cl.
*H04W 4/00* (2018.01)
*H04B 7/185* (2006.01)
*H04W 76/15* (2018.01)
*H04W 72/14* (2009.01)

(52) U.S. Cl.
CPC ........ *H04B 7/18513* (2013.01); *H04W 72/14* (2013.01); *H04W 76/15* (2018.02)

(58) Field of Classification Search
None
See application file for complete search history.

(56) References Cited

U.S. PATENT DOCUMENTS

| | | | |
|---|---|---|---|
| 5,543,811 | A | 8/1996 | Chethik |
| 6,711,224 | B1 | 3/2004 | Benning et al. |
| 8,315,185 | B2 | 11/2012 | Chan |
| 8,346,286 | B2 | 1/2013 | Lee et al. |
| 8,543,063 | B2 | 9/2013 | Bergel et al. |
| 8,594,053 | B2 | 11/2013 | Kim et al. |
| 8,605,644 | B2 | 12/2013 | Wang |
| 8,774,150 | B1 | 7/2014 | Jeffery et al. |
| 8,923,192 | B2 | 12/2014 | Gong |
| 9,204,441 | B2 | 12/2015 | Nagaraja et al. |
| 9,253,766 | B2 | 2/2016 | Yang et al. |

(Continued)

FOREIGN PATENT DOCUMENTS

| | | |
|---|---|---|
| EP | 3081041 | 10/2016 |
| EP | 3105958 | 12/2016 |

(Continued)

OTHER PUBLICATIONS

"Final Office Action", U.S. Appl. No. 15/842,318, dated Jul. 10, 2019, 15 Pages.

(Continued)

*Primary Examiner* — Elisabeth Benoit Magloire
(74) *Attorney, Agent, or Firm* — Colby Nipper PLLC (57) ABSTRACT

The present disclosure describes methods and apparatuses for satellite-based narrow-band communication. In some aspects, the systems include a user device (102) that establishes a Narrow-Band Internet of Things (NB-IoT) wireless connection (106) with one or more orbital satellites (104) in order to transmit (108) and receive (110) data when other wireless connections are not available. The data may be relayed by the orbital satellite (104) to and from a base station (202) on Earth.

20 Claims, 8 Drawing Sheets

(56) References Cited

U.S. PATENT DOCUMENTS

| | | |
|---|---|---|
| 9,258,798 B2 | 2/2016 | Li et al. |
| 9,271,290 B2 | 2/2016 | Pelletier et al. |
| 9,414,430 B2 | 8/2016 | Vajapeyam et al. |
| 9,425,923 B2 | 8/2016 | Ratasuk et al. |
| 9,686,667 B2 | 6/2017 | Artuso |
| 9,900,133 B2 | 2/2018 | Lu et al. |
| 10,080,244 B2 | 9/2018 | Lei et al. |
| 10,084,535 B1 | 9/2018 | Speidel et al. |
| 10,148,329 B2 | 12/2018 | Yue et al. |
| 10,375,671 B2 | 8/2019 | Stauffer et al. |
| 10,608,721 B2 | 3/2020 | Wang et al. |
| 2006/0205346 A1* | 9/2006 | Evans .......... H04B 1/1036 455/12.1 |
| 2007/0018630 A1 | 1/2007 | Oehm |
| 2008/0018427 A1 | 1/2008 | Ezra et al. |
| 2009/0102715 A1 | 4/2009 | Lou et al. |
| 2009/0180451 A1 | 7/2009 | Alpert et al. |
| 2010/0304680 A1* | 12/2010 | Kuffner .......... H04B 7/10 455/63.1 |
| 2011/0002373 A1 | 1/2011 | Jeon |
| 2011/0128866 A1* | 6/2011 | Tian .......... H04L 1/0025 370/252 |
| 2011/0205981 A1 | 8/2011 | Koo et al. |
| 2012/0039280 A1 | 2/2012 | Chen et al. |
| 2012/0208547 A1 | 8/2012 | Geirhofer et al. |
| 2012/0275384 A1 | 11/2012 | Long et al. |
| 2012/0295623 A1* | 11/2012 | Siomina .......... G01S 5/0263 455/436 |
| 2013/0012141 A1 | 1/2013 | Harnishfeger |
| 2013/0301454 A1 | 11/2013 | Seol et al. |
| 2014/0146732 A1 | 5/2014 | Olufunmilo et al. |
| 2014/0213277 A1* | 7/2014 | Jang .......... H04W 28/08 455/453 |
| 2014/0362752 A1 | 12/2014 | Jha et al. |
| 2015/0126239 A1* | 5/2015 | Kim .......... H04W 52/146 455/522 |
| 2015/0289147 A1 | 10/2015 | Lou et al. |
| 2015/0349741 A1 | 12/2015 | Lehtola et al. |
| 2015/0382205 A1 | 12/2015 | Lee et al. |
| 2016/0029235 A1 | 1/2016 | Kim et al. |
| 2016/0050002 A1 | 2/2016 | Wei et al. |
| 2016/0072564 A1 | 3/2016 | Li et al. |
| 2016/0076945 A1 | 3/2016 | Huang et al. |
| 2016/0127997 A1 | 5/2016 | Ang et al. |
| 2016/0135213 A1 | 5/2016 | Zhu et al. |
| 2016/0179124 A1 | 6/2016 | Madan et al. |
| 2016/0234736 A1 | 8/2016 | Kubota et al. |
| 2016/0270027 A1 | 9/2016 | Ang et al. |
| 2016/0286524 A1 | 9/2016 | Griot et al. |
| 2016/0294531 A1 | 10/2016 | Loehr et al. |
| 2016/0345189 A1* | 11/2016 | Miyagawa .......... H04W 16/14 |
| 2016/0345234 A1* | 11/2016 | Yang .......... H04W 36/0022 |
| 2016/0353424 A1 | 12/2016 | Stirling-Gllacher et al. |
| 2017/0026293 A1 | 1/2017 | Desclos et al. |
| 2017/0026962 A1 | 1/2017 | Liu et al. |
| 2017/0149480 A1 | 5/2017 | Kakishima et al. |
| 2017/0180095 A1 | 6/2017 | Xue et al. |
| 2017/0195031 A1 | 7/2017 | Onggonsanusi et al. |
| 2017/0201982 A1 | 7/2017 | Alvarino et al. |
| 2017/0237783 A1* | 8/2017 | Yang .......... H04L 65/1083 370/331 |
| 2017/0257842 A1 | 9/2017 | Hessler et al. |
| 2017/0310417 A1 | 10/2017 | Jung et al. |
| 2017/0331577 A1 | 11/2017 | Parkvall et al. |
| 2017/0331670 A1* | 11/2017 | Parkvall .......... H04W 52/0245 |
| 2017/0347334 A1 | 11/2017 | Akkarakaran et al. |
| 2017/0367046 A1 | 12/2017 | Papasakellariou |
| 2017/0367069 A1 | 12/2017 | Agiwal et al. |
| 2017/0374579 A1 | 12/2017 | Wang et al. |
| 2018/0014251 A1 | 1/2018 | Sambhwani et al. |
| 2018/0070282 A1 | 3/2018 | Su et al. |
| 2018/0077734 A1 | 3/2018 | Kim et al. |
| 2018/0109353 A1 | 4/2018 | Kwak et al. |
| 2018/0139014 A1 | 5/2018 | Xiong et al. |
| 2018/0139701 A1 | 5/2018 | Want et al. |
| 2018/0184422 A1 | 6/2018 | Cavalcanti et al. |
| 2018/0191415 A1 | 7/2018 | Aryafar et al. |
| 2018/0199306 A1* | 7/2018 | Edge .......... H04W 64/003 |
| 2018/0206217 A1 | 7/2018 | Martin et al. |
| 2018/0213529 A1 | 7/2018 | Lee et al. |
| 2018/0227902 A1 | 8/2018 | Gholmieh et al. |
| 2018/0227960 A1 | 8/2018 | Belghoul et al. |
| 2018/0279303 A1 | 9/2018 | Sun et al. |
| 2018/0279324 A1 | 9/2018 | Wang et al. |
| 2018/0295552 A1* | 10/2018 | Chakraborty .......... H04W 36/14 |
| 2018/0332605 A1 | 11/2018 | Pelletier |
| 2018/0343043 A1 | 11/2018 | Hakola et al. |
| 2018/0367230 A1 | 12/2018 | Su et al. |
| 2019/0007844 A1 | 1/2019 | Müller et al. |
| 2019/0029005 A1 | 1/2019 | Bendlin et al. |
| 2019/0037586 A1 | 1/2019 | Park et al. |
| 2019/0052419 A1 | 2/2019 | Yang et al. |
| 2019/0058516 A1 | 2/2019 | Yang et al. |
| 2019/0089436 A1 | 3/2019 | Wei et al. |
| 2019/0089506 A1 | 3/2019 | Takeda et al. |
| 2019/0123798 A1 | 4/2019 | Lou et al. |
| 2019/0132830 A1 | 5/2019 | Tabet et al. |
| 2019/0141767 A1 | 5/2019 | Wang et al. |
| 2019/0159140 A1 | 5/2019 | Wang et al. |
| 2019/0173626 A1 | 6/2019 | Wang et al. |
| 2019/0174433 A1 | 6/2019 | Nory et al. |
| 2019/0174497 A1 | 6/2019 | Wang et al. |
| 2019/0190577 A1 | 6/2019 | Wang et al. |
| 2019/0190641 A1 | 6/2019 | Wang et al. |
| 2019/0191440 A1 | 6/2019 | Wang et al. |
| 2019/0200322 A1 | 6/2019 | Wang et al. |
| 2019/0229789 A1 | 7/2019 | Zhang et al. |
| 2019/0230603 A1 | 7/2019 | Liu et al. |
| 2019/0230607 A1 | 7/2019 | Chung et al. |
| 2019/0239168 A1 | 8/2019 | Li et al. |
| 2019/0288809 A1 | 9/2019 | Iyer et al. |
| 2019/0306830 A1 | 10/2019 | Wang et al. |
| 2019/0349968 A1 | 11/2019 | Yerramalli et al. |
| 2019/0356368 A1 | 11/2019 | Liu et al. |
| 2019/0380140 A1 | 12/2019 | Wong et al. |
| 2020/0028745 A1 | 1/2020 | Parkvall et al. |
| 2020/0052782 A1 | 2/2020 | Wang et al. |

FOREIGN PATENT DOCUMENTS

| | | |
|---|---|---|
| EP | 3123802 | 2/2017 |
| KR | 100860050 | 9/2008 |
| WO | 2013070149 | 5/2013 |
| WO | 2015086215 | 6/2015 |
| WO | 2016119882 | 8/2016 |
| WO | 2016133106 | 8/2016 |
| WO | 2016204811 | 12/2016 |
| WO | 2017011802 | 1/2017 |
| WO | 2017025366 | 2/2017 |
| WO | 2017030601 | 2/2017 |
| WO | 2017083514 | 5/2017 |
| WO | 2017088898 | 6/2017 |
| WO | 2017109549 | 6/2017 |
| WO | 2017111987 | 6/2017 |
| WO | 2017117340 | 7/2017 |
| WO | 2017127126 | 7/2017 |
| WO | 2017146773 | 8/2017 |
| WO | 2017150863 | 9/2017 |
| WO | 2017195463 | 11/2017 |
| WO | 2017196243 | 11/2017 |
| WO | 2018031846 | 2/2018 |
| WO | 2018034998 | 2/2018 |
| WO | 2018064068 | 4/2018 |
| WO | 2019094078 | 5/2019 |
| WO | 2019112648 | 6/2019 |
| WO | 2019118020 | 6/2019 |
| WO | 2019118787 | 6/2019 |
| WO | 2019118915 | 6/2019 |
| WO | 2019126791 | 6/2019 |
| WO | 2019193768 | 10/2019 |

(56) References Cited

OTHER PUBLICATIONS

"First Action Interview Office Action", U.S. Appl. No. 15/842,318, dated May 7, 2019, 3 pages.
"International Search Report and Written Opinion", PCT Application No. PCT/US2018/065829, dated Jun. 18, 2019, 28 pages.
"International Search Report and Written Opinion", PCT Application No. PCT/US2018/065557, dated Jun. 21, 2019, 38 pages.
"Non-Final Office Action", U.S. Appl. No. 15/939,060, dated May 23, 2019, 15 pages.
"Pre-Interview Communication", U.S. Appl. No. 15/833,312, dated Apr. 19, 2019, 4 pages.
"Pre-Interview Communication", U.S. Appl. No. 15/844,093, dated Jun. 28, 2019, 5 pages.
"3rd Generation Partnership Project", Technical Specification Group Radio Access Network; NR and NG-RAN Overall; 3GPP Standard; Technical Specification; 3GPP TS 38.300, 3rd Generation Partnership Project (3GPP), Mobile Competence Centre, Nov. 17, 2017, 56 pages.
"3rd Generation Partnership Project; Technical Specification Group Radio Access Network", Evolved Universal Terrestrial Radio Access (E-UTRA) and NR; Multi-connectivity; Stage 2 (Release 15); 3GPP Standard; Technical Specification; 3GPP TS 37.340, 3rd Generation Partnership Project (3GPP), Mobile Competence Centre, Nov. 17, 2017, 49 pages.
"International Search Report and Written Opinion", PCT Application No. PCT/US2018/041696, dated Oct. 9, 2018, 30 pages.
"International Search Report and Written Opinion", PCT Application No. PCT/US2018/046004, dated Nov. 22, 2018, 13 pages.
"Invitation to Pay Additional Fees", PCT Application No. PCT/US2018/049403, dated Nov. 19, 2018, 13 pages.
"Restriction Requirement", U.S. Appl. No. 15/842,318, dated Oct. 4, 2018, 7 pages.
Gineste, et al., "Narrowband IoT Service Provision to 5G User Equipment Via a Satellite Component", 2017 IEEE GLOBECOM Workshops, IEEE, Dec. 4, 2017, Dec. 4, 2017, 4 pages.
Thales, et al., "FS_5GSAT, Draft Use Case, Internet of Things with a Satellite Component", 3GPP TSG-SA WG1 Meeting #80; S1-174441; Reno, Nevada, USA, Nov. 27-Dec. 1, 2017, 2017, 2 pages.
"Dragonfly Narrowband IoT Unveiled with GNSS Option", GPS World Staff; Retrieved from http://gpsworld.com/dragonfly-narrowband-iot-unveiled-with-gnss-option/ on Dec. 7, 2017, Mar. 7, 2017, 5 pages.
"Leading the LTE IoT Evolution to Connect the Massive Internet of Things", Qualcomm, Inc., Jun. 2017, 41 pages.
"NB-IOT, Accelerating Cellular IOT", Huawei; Roads to MBB 2020; Building a Better Connected World; Global Mobile Broadband Forum 2015; Hong Kong, Nov. 2-5, 2015, 4 pages.
"Non-Final Office Action", U.S. Appl. No. 15/852,572, dated Sep. 14, 2018, 6 pages.
"Restriction Requirement", U.S. Appl. No. 15/852,572, dated Jun. 11, 2018, 9 pages.
Dutta, et al., "Frame Structure Design and Analysis for Millimeter Wave Cellular Systems", avix.org; NYU Wireless, New York University Tandon School of Engineering, Aug. 20, 2016, 31 pages.
Jantti, "Machine Type Communications for Internet of Things—Recent advances and future possibilities", WNCG; Seminar, Oct. 7, 2016, 1 page.
Landstrom, et al., "NB-IOT: A Sustainable Technology for Connecting Billions of Devices", Ericsson Technology Review; Standardizing Narrowband IoT, Apr. 22, 2016, 12 pages.
Pederson, et al., "A Flexible Frame Structure for 5G Wide Area", Aalborg University, Proceedings of IEEE VTC Fall-2015, 2015, 6 pages.
"Final Office Action", U.S. Appl. No. 15/833,312, dated Oct. 7, 2019, 15 Pages.
"First Action Interview Office Action", U.S. Appl. No. 15/844,093, dated Sep. 16, 2019, 4 Pages.
"Non-Final Office Action", U.S. Appl. No. 15/832,395, dated Aug. 30, 2019, 20 Pages.
"Non-Final Office Action", U.S. Appl. No. 16/446,416, dated Oct. 18, 2019, 7 Pages.
"Notice of Allowance", U.S. Appl. No. 15/842,241, dated Aug. 5, 2019, 6 pages.
"Written Opinion of the International Searching Authority", PCT Application No. PCT/US2018/046004, dated Oct. 21, 2019, 6 pages.
"Evolved Universal Terrestrial Radio Access (E-UTRA)", 3rd Generation Partnership Project; Technical Specification Group Radio Access Network; Evolved Universal Terrestrial Radio Access (E-UTRA); Radio Resource Control (RRC); Protocol specification (Release 10), Mar. 2013, 307 pages.
"International Search Report and Written Opinion", PCT Application No. PCT/US2018/049403, dated Jan. 16, 2019, 21 pages.
"International Search Report and Written Opinion", PCT Application No. PCT/US2018/067367, dated Mar. 20, 2019, 19 pages.
"Invitation to Pay Additional Fees", PCT Application No. PCT/US2018/065557, dated Mar. 13, 2019, 19 pages.
"Invitation to Pay Additional Fees", PCT Application No. PCT/US2018/065829, dated Mar. 15, 2019, 13 pages.
"Non-Final Office Action", U.S. Appl. No. 15/832,395, dated Feb. 27, 2019, 18 pages.
"Non-Final Office Action", U.S. Appl. No. 15/842,241, dated Mar. 11, 2019, 12 pages.
"Notice of Allowance", U.S. Appl. No. 15/852,572, dated Mar. 11, 2019, 5 pages.
"Pre-Interview Communication", U.S. Appl. No. 15/842,318, dated Mar. 29, 2019, 4 pages.
"Final Office Action", U.S. Appl. No. 15/939,060, dated Nov. 29, 2019, 17 pages.
"Notice of Allowance", U.S. Appl. No. 15/842,241, dated Dec. 5, 2019, 5 Pages.
"Written Opinion", PCT Application No. PCT/US2018/065557, dated Nov. 15, 2019, 4 pages.
"Written Opinion of the International Preliminary Examining Authority", PCT Application No. PCT/US2018/049403, dated Oct. 25, 2019, 8 pages.
"International Preliminary Report on Patentability", PCT Application No. PCT/US2018/046004, dated Jan. 23, 2020, 21 pages.
"Final Office Action", U.S. Appl. No. 15/832,395, dated Apr. 2, 2020; 23 Pages.
"International Preliminary Report on Patentability", PCT Application No. PCT/US2018/049403, dated Mar. 13, 2020, 20 pages.
"International Preliminary Report on Patentability", PCT Application No. PCT/US2018/067367, dated Mar. 17, 2020, 23 pages.
"Notice of Allowance", U.S. Appl. No. 15/844,093, dated Mar. 2, 2020, 10 Pages.
"Written Opinion of the International Preliminary Examining Authority", PCT Application No. PCT/US2018/065557, dated Feb. 4, 2020, 13 pages.
Guidotti, et al., "LTE-Based Satellite Communications in LEO Mega-Constellations", 2017 John Wiley & Sons, Ltd., 2017, 17 pages.
O'Hara, et al., "Providing Narrowband IoT Coverage with Low Earth Orbit Satellites", 2019 Horizon House Publications, Inc., 2019, 4 pages.
"Notice of Allowance", U.S. Appl. No. 15/844,093, dated May 13, 2020, 11 Pages.

* cited by examiner

SATELLITE-BASED NARROW-BAND COMMUNICATION

RELATED APPLICATION

This application claims priority under 35 U.S.C. § 119(e) to U.S. Provisional Patent Application 62/599,522, filed on Dec. 15, 2017, which is incorporated herein by reference in its entirety.

BACKGROUND

Wireless cellular-based communication has become a primary source of communication for many people, particularly when travelling outside of the home or office. In these situations, people rely on availability of a wireless cellular network to communicate with family, friends, emergency responders, doctors, or roadside assistance. One disadvantage of wireless cellular networks is that they have a limited communication range. For example, when travelling outside of a city, a user of a mobile device may be out of range of a wireless cellular network and may be unable to communicate.

In another example, a wireless cellular network that would otherwise be available may be unusable due to a disaster that has disabled a base station of the wireless cellular network (e.g. cell tower). For example, after a natural disaster, base stations of a network may be damaged, or power may be cut off leading to loss of network availability. Because of the limited communication range, a user device may be unable to reach an unaffected base station of the network and, thus, also unable to communicate remotely.

SUMMARY

This document describes techniques for, and systems that enable, satellite-based narrow-band communication for communicating between a user device and one or more orbital satellites. In some aspects, the techniques include a user device establishing a wireless connection via one or more orbital satellites using a narrow-band Internet-of-Things (NB-IoT) radio access technology (RAT). The user device communicates data over the wireless satellite connection including one or more of transmitting data or receiving data. The user device may determine to establish the wireless connection via one or more orbital satellites based on a quality of another, higher-bandwidth connection falling below a quality threshold. For example, the user device determines that it is out of range of a wireless connection using a 5th generation (5G) new radio (NR) RAT, so it detects the NB-IoT-based wireless connection as an alternative connection for wireless communication.

In some aspects, an orbital satellite establishes a wireless connection with a base station using a radio access technology. The wireless connection may be at a high-frequency band, such as a C-band frequency, capable of providing a high bandwidth for communicating a high volume of data. The orbital satellite also establishes another wireless connection with a user device using an NB-IoT RAT. The orbital satellite receives data from the base station over the wireless connection and transmits at least a portion of the data to the user device over the NB-IoT-based wireless connection. Additionally, the orbital satellite may receive data from the user device over the NB-IoT-based wireless connection and transmit at least a portion of the data to the base station over the wireless connection.

In some aspects, the techniques include enabling the orbital satellite to implement a narrow-band communication scheme for communicating with a user device using fewer than all resource elements or subcarriers of a resource block. The narrow-band communication scheme allows for focusing a link budget, otherwise allocated for an entire resource block, on a narrow band of the resource block. This focus of the link budget increases a power spectral density of signals sent within the narrow band, which increases a range of the signals. For example, narrow-band communication may be implemented with one or more resource elements spanning 15 kHz or 180 kHz of bandwidth, instead of typical wideband allocations of 20 MHz to 1 GHz of bandwidth.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of satellite-based narrow-band communication is described below. The use of the same reference numbers in different instances in the description and the figures may indicate like elements.

DETAILED DESCRIPTION

Generally, users rely on user devices for communication when travelling outside of a home or office environment. Many parts of the world, however, have insufficient cellular service to allow a user device to communicate through a wireless cellular network. For example, a driver may become stranded on a remote road with vehicle problems and unable to contact roadside assistance via their cellular phone. In such a situation, the driver may have to choose between walking to a callbox or location with cellular service or waiting on the side of the road for another driver.

In another example, a hiker may be lost in a remote area without cellular service and unable to contact emergency services.

Similarly, an area that normally has wireless coverage may lose connectivity. For example, a disaster, such as a hurricane, earthquake, bombing, or tsunami can strike an area and damage cell towers. Unless user devices are able to reach unaffected cell towers, local residents are often unable to communicate remotely with each other and/or with emergency responders. Even minimal communication, such as location sharing, can help emergency responders locate people more effectively without resulting to manual searching techniques.

To enable communication in these situations, as well as others, this document describes techniques and systems for satellite-based narrow-band communication. These techniques and systems can allow for communication through a user device without reliance on a local base station providing a wireless connection. These techniques include establishing a wireless connection between the user device and a wireless network via one or more orbital satellites. More particularly, the wireless connection may use an NB-IoT radio access technology (RAT) to transmit and receive data between the user device and an orbital satellite in a low Earth orbit. Narrow-band communication utilizes fewer allocated resource elements, which increases the range capabilities of the wireless connection due to a power spectral density of signals sent via the allocated resource elements. A bandwidth of the wireless connection decreases, however, due to fewer resource elements being allocated.

In the example of a disaster or power outage that renders local cell towers inoperable, satellite-based narrow-band communication may be implemented to provide emergency communication for local residents. For instance, a user device may search for and detect an NB-IoT-based wireless network provided via one or more orbital satellites based on a determination that a previously available wireless network (local cellular network) is unavailable. The user device may search for the NB-IoT-based wireless network automatically (e.g. without user input) or at a request of a user. After a wireless connection is established with the NB-IoT-based wireless network, the user can send data, such as a request for rescue, or receive data, such as an emergency broadcast message (e.g. a warning of another disaster or instructions for receiving aid). Thus, the techniques and systems for satellite-based narrow-band communication, as described herein, may be particularly beneficial in emergency situations when traditional wireless communication is unavailable.

The following discussion describes an operating environment, an example networking environment in which devices of the operating environment may be implemented, and techniques that may be employed in the operating environment or the network environment. In the context of the present disclosure, reference is made to the operating environment or networking environment by way of example only.

Operating Environment

Figure 1:
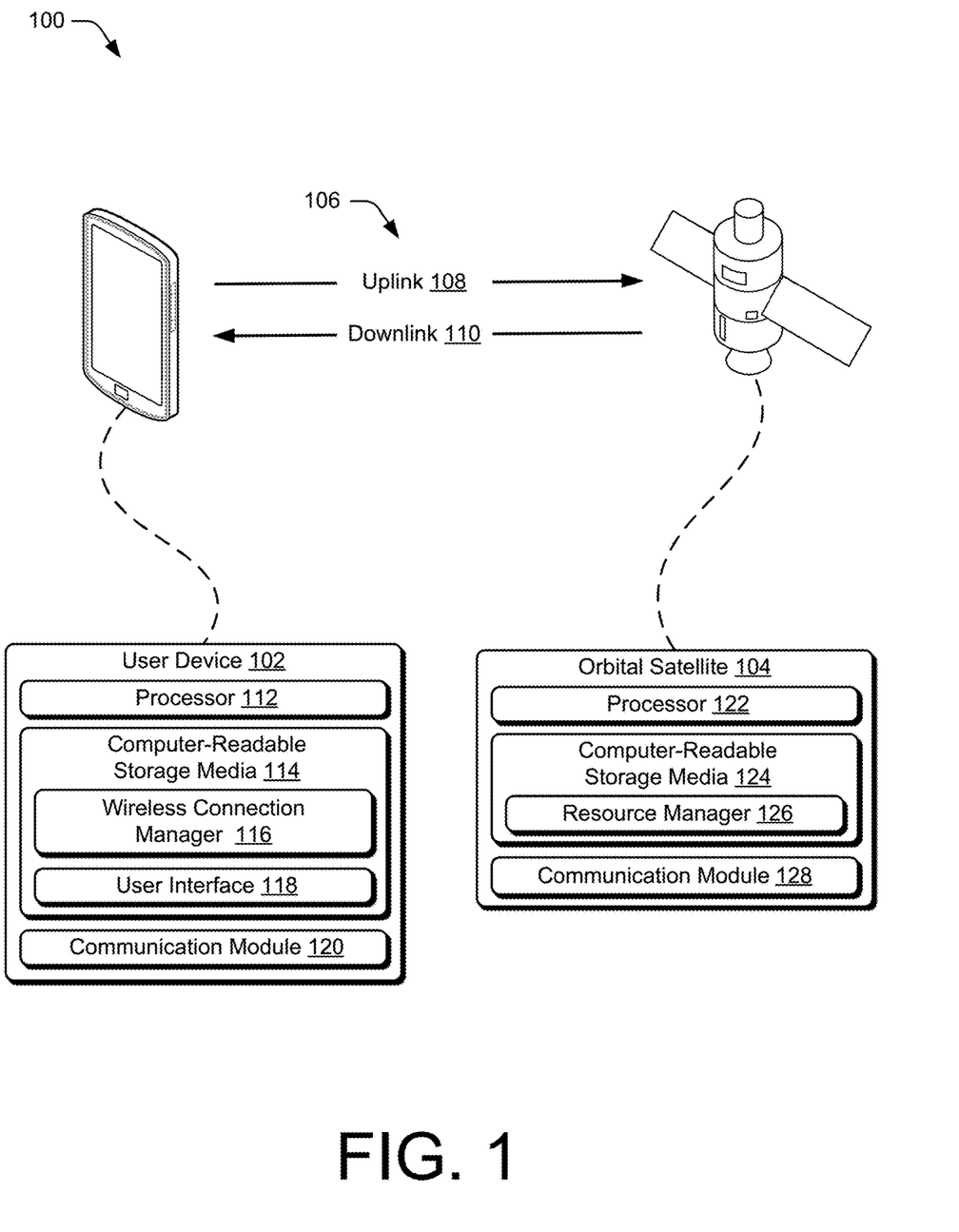
FIG. 1 illustrates example device configurations of a user device and an orbital satellite in accordance with one or more aspects of satellite-based narrow-band communication.

FIG. 1 illustrates an example operating environment 100 in which devices for satellite-based narrow-band communication can be implemented. In this example, the operating environment includes a user device 102 and an orbital satellite 104 that are respectively configured to communicate over a wireless connection 106 of a wireless network. Generally, the wireless connection 106 includes an uplink 108 by which the user device 102 transmits data to the orbital satellite 104 and a downlink 110 by which the orbital satellite 104 transmits other data to the user device 102. The wireless connection 106 may be implemented in accordance with any suitable protocol or standard that provides a range sufficient to communicate data between the user device 102 and the orbital satellite 104. For example, the wireless connection 106 may be implemented using a narrow-band wireless signal to provide an increased range compared to a full-band (or "wide-band") wireless signal of a same RAT given a constant transmission power. The wireless connection 106 has an increased range relative to a full-band signal of the same RAT due to the power spectral density of the communication. By allocating fewer resource elements to the wireless connection 106, more energy can be allocated to each resource element within the wireless connection 106. Although shown or described with reference to a separate uplink 108 or downlink 110, communication between the user device 102 and the orbital satellite 104 may also be referred to as a wireless link, wireless association, frame exchange, or communication link.

The wireless connection 106 may be implemented as an NB-IoT signal because an NB-IoT-type wireless connection can have a link budget that is 20 decibels higher than that of many other cellular technologies (due to the spectral density of the narrow band signal). NB-IoT wireless connections may be particularly effective when operating at frequencies below 2 GHz, where the link budgets are particularly useful for increased range when compared to wider band wireless communication techniques. In some implementations, the NB-IoT wireless connection may operate at frequencies at or around 700 MHz.

The user device 102 includes a processor 112, computer-readable storage media (CRM) 114 having a wireless connection manager 116 and a user interface 118, and a communication module 120. The user device 102 is illustrated as a smart phone, however the user device 102 may instead be implemented as any device with wireless communication capabilities, such as a mobile gaming console, a tablet, a laptop, an advanced driver assistance system (ADAS), a point-of-sale (POS) terminal, a health monitoring device, a drone, a camera, a media-streaming dongle, a wearable smart-device, an IoT device, a personal media device, a navigation device, a mobile-internet device (MID), a wireless hotspot, a femtocell, or a broadband router.

The processor 112 of the user device 102 can execute processor-executable instructions or code stored by the CRM 114 to cause the user device to perform operations or implement various device functionalities. In some cases, the processor 112 is implemented as an application processor (e.g., multicore processor) or a system-on-chip with other components of the user device integrated therein. The CRM 114 may include any suitable type of memory media or storage media, such as read-only memory (ROM), programmable ROM (PROM), random access memory (RAM), static RAM (SRAM), or Flash memory. In the context of this discussion, the CRM 114 of the user device 102 is implemented as hardware-based storage media, which does not include transitory signals or carrier waves. In some cases, the CRM 114 stores firmware, an operating system, or applications of the user device 102 as instructions, code, or information. The instructions, code or information can be executed by the processor 112 to implement various functionalities of the user device 102, such as those related to network access or audio encoding features. In this example, the CRM 114 also stores processor-executable code or instructions for implementing the wireless connection manager 116 and the user interface 118 of the user device 102.

The communication module 120 of the user device 102 includes a hardware-based transceiver having a receiver, a transmitter, and associated circuitry or other components for communicating with the orbital satellite 104 via the wireless connection 106. In some implementations, the transceiver is also configured to communicate with a local base station over another wireless connection. This may be facilitated by the wireless connection 106 and the other wireless connection operating at co-banded frequency ranges. For example, the wireless connection 106 may be configured to operate in the L-band, the S-band, or the C-band depending on a frequency band of the other wireless connection. In this way, the user device 102 may communicate over the wireless connection 106 or the other wireless connection using a single transceiver.

The communication module 120 may transmit data, via the transmitter, to the orbital satellite 104 via the uplink 108. The data transmitted to the orbital satellite 104 may include any suitable type of framed or packetized information, such as one or more of device status information, wireless link status information, wireless link control information, data requests, application data, or network access requests. The communication module 120 may also receive, via the receiver, communication data from the orbital satellite 104, such as wireless link configuration settings, network control information, or communication mode selection. The receiver may produce a link budget gain of less than 20 decibels. More specifically, the receiver may produce a link budget gain of less than 10 decibels, less than 5 decibels, or about 0 decibels.

In some aspects, the wireless connection manager 116 may determine a status for each respective available wireless connection. A status of a wireless connection can be based on a signal quality and a bandwidth for communicating data. The wireless connection manager 116 may then cause the user device 102 to connect to a preferred wireless connection based on a comparison of the statuses of the available wireless connections. For example, the wireless connection manager 116 may connect the user device 102 to a 5th generation new radio (5G NR) wireless signal instead of a 4th generation long term evolution (LTE) protocol (4G LTE) wireless signal based on a comparison of available bandwidth, so long as a signal quality of the 5G NR wireless connection is sufficient for reliable communication.

In an example implementation of satellite-based narrow-band communication, the wireless connection manager 116 determines that a 5G NR wireless connection and a 4G LTE wireless connection are unavailable, or a signal quality is below a quality threshold. The wireless connection manager 116 then detects an NB-IoT wireless signal from having a signal quality above the quality threshold from orbital satellite 104 and causes the user device 102 to establish an NB-IoT-based wireless connection with orbital satellite 104. The user device 102 can then communicate with orbital satellite 104 via the NB-IoT-based wireless connection including one or more of transmitting or receiving data.

The user interface 118 may provide a notification of connecting to an NB-IoT wireless connection. Additionally or alternatively, the user interface 118 may provide a menu for receiving a selection to enter a satellite communication mode or an emergency communication mode. These are but a few implementations of the wireless communication manager 116 and the user interface 118, which are described further or with other aspects throughout the disclosure.

In this example, the orbital satellite 104 is shown generally as an orbital satellite of a wireless network. The orbital satellite 104 may be representative of a single orbital satellite having multiple transmitters and may be capable of establishing multiple wireless connections with multiple user devices. Alternatively, the orbital satellite 104 may represent a system of multiple orbital satellites that are collectively capable of establishing and maintaining multiple wireless connections with multiple user devices, which may be at various locations on Earth.

When implemented as a system of multiple orbital satellites, the NB-IoT network may extend to cover large portions of Earth. This may be particularly advantageous when the multiple orbital satellites are at an orbital distance that requires movement relative to the surface of Earth. For example, at low Earth orbit, a satellite circles Earth several times in a day. Therefore, a single orbital satellite in low Earth orbit cannot provide a constant signal to any single location for more than a portion of a day. In other words, at any given time, a satellite is able to provide a signal to a specific area that moves with the satellite. When a sufficient quantity of satellites is implemented, the network may be maintained over large areas, e.g. most of the Earth's surface. Alternatively, the system of multiple orbital satellites may be configured such that the particular locations are not left without the narrow-band cellular network for longer than a predetermined time. For example, the satellites may be configured to provide the narrow-band cellular network within the coverage area for at least a half-hour of every hour of the day (the timing would change based on location). Alternatively, the multiple orbital satellites may be configured to provide the narrow-band cellular network for at least 5 minutes during every 10 minute interval. Alternatively, if an orbital satellite is in geostationary orbit, the satellite may be at a fixed location relative to the surface of Earth. The geostationary orbital satellite can maintain a fixed beam for communicating with one or more user devices located with a geographical area that is substantially fixed in location.

Additionally or alternatively, the system of multiple orbital satellites may cooperate to form a phased array configuration that forms one or more beams to improve a signal quality of the narrow-band cellular network. This cooperation may be controlled by an orbital satellite or by a ground-based controller, such as a mobility management entity (MME) of the narrow-band cellular network. The phased array configuration may improve a signal sufficiently to allow the system of orbital satellites to orbit in the medium Earth orbit or geostationary Earth orbit distance from Earth. Repetition coding may also be used to improve signal quality.

The orbital satellite 104 can be configured as a base station, such that the orbital satellite 104 controls or configures parameters of the uplink 108 or the downlink 110 in accordance with one or more of the wireless standards or protocols described herein. In some of these configurations, the orbital satellite 104 communicates data with an Earth-based network via another wireless connection and at a different frequency than the wireless signals provided to the user device 102. Alternatively, the orbital satellite 104 can be configured as a repeater for a ground-based wireless network provider. In these configurations, the orbital satellite 104 may perform one or more of translating, amplifying, or redirecting signals from the wireless network provider for transmitting to the user device 102. Additionally, the orbital satellite 104 may repeat a signal from the user device 102 by performing one or more of translating, amplifying, or redirecting signals from the user device 102 for transmitting to the wireless network provider.

The orbital satellite 104 includes a processor 122, computer-readable storage media (CRM) 124 having a resource manager 126, and a communication module 128. The processor 122 can execute processor-executable instructions or code stored by the CRM 124 to perform operations or implement various base station functionalities. In some cases, the processor 122 is implemented as multiple processor cores or a multicore processor configured to execute firmware or an operating system of the orbital satellite 104. The CRM 124 may include any suitable type of memory media or storage media, such as ROM, PROM, RAM, SRAM, or Flash memory. In the context of this discussion, the CRM 124 is implemented as hardware-based storage media, which does not include transitory signals or carrier waves. The CRM 124 of the orbital satellite 104 may store firmware, an operating system, or applications of the base station as instructions, code, or other information. The instructions or code can be executed by the processor 122 to implement various functionalities of the orbital satellite 104, such as to manage connectivity or parameters of the wireless connection 106 with the user device 102. In this example, the CRM 124 also stores processor-executable code or instructions for implementing the resource manager 126 of the orbital satellite 104.

The communication module 128 of the orbital satellite 104 includes a hardware-based transceiver having a receiver, a transmitter, and associated circuitry or other components for communicating with the user device 102 via the wireless connection 106. In some cases, the communication module 128 includes, or is coupled with, multiple transceivers and antenna arrays that are configured to establish and manage wireless links with multiple user devices. The orbital satellite 104 may communicate data to the user device 102 (or other mobile stations) through the downlink 110, such as a schedule of one or more data frames, uplink grants, application data, wireless link status information, or wireless link control information.

In some aspects, the resource manager 126 of the orbital satellite 104 is implemented to perform various functions associated with allocating physical access (e.g., resource blocks) or allocating communication resources available to the orbital satellite 104. The physical access, such as an air interface of the orbital satellite 104, may be partitioned or divided into various units (e.g., frames) of bandwidth, time, carriers, symbols, or the like. For example, within a framework of the IoT protocol, the resource manager 126 can allocate bandwidth and time intervals of access in resource blocks, each of which can be allocated in whole, or in part, to one or more user devices communicating with the orbital satellite 104.

These resource blocks can be divided into, or include, subcarriers, where each subcarrier (i) spans a portion of the specified bandwidth and (ii) includes an amount of time or number of symbols corresponding to a subinterval of a specified length of the resource block. With reference to the IoT protocol, a resource block may span a bandwidth of 180 kilohertz (kHz) for an interval of one-half of a millisecond (ms). The frequency span (e.g., carrier) of a resource block (RB) may include 12 subcarriers, such that a subcarrier spans a bandwidth of 15 kHz (12×15 kHz=180 kHz), and a resource block (RB) of 12 subcarriers.

The resource manager 126 of the orbital satellite 104 may implement narrow-band communication with the user device 102 by allocating, from a resource block, a quantity of resource elements or subcarriers to the user device 102. The quantity of resource elements or subcarriers may be determined by a distance from the orbital satellite to the user device. A higher quantity of resource elements increases bandwidth, but decreases a power spectral density of a signal transmitted across those resource elements, which reduces a range of the signal. The resource manager 126 may then select, from a resource block, the determined quantity of resource elements for allocation to the user device 102 to facilitate narrow-band communication. In a narrow-band communication mode, the selected resource elements may include a portion, but not all, of a resource block (e.g., a wide-band resource block). For example, the portion of the resource block may include one or more symbols of a subcarrier of the resource block. Alternately or additionally, the selected resource elements may include another subcarrier of the resource block or a portion, or all of, another resource block.

The resource manager 126 can also communicate, to the user device 102, an identification of the selected resource elements for narrow-band communication via the downlink 110. The identification may include frequencies or time locations of the selected resource elements. The frequencies or time locations may be effective to enable the user device 102 to communicate in the narrow-band mode via the selected resource elements. In such an instance, the indication may be communicated from the orbital satellite 104 to the user device 102 as part of a Radio Resource Control (RRC) message or Downlink Control Information (DCI) message.

Using the described techniques, the resource manager 126 can provide a low-bandwidth, high-range wireless network. The low-bandwidth, high-range wireless network may be specific to the user device 102 or may be used for communication with several user devices. For example, the resource manager 126 may cause the orbital satellite 104 to facilitate, by generating or repeating signals, the wireless connection 106 over which low-data messages, such as a text message, may be transmitted and received by a user device 102.

In some implementations, the resource manager 126 or a ground-based controller, such as a mobility management entity (MME), manages frame timing of the wireless connection 106. In land-based LTE wireless connections, communications may be transmitted in response to another communication received 4 subframes (or 4 ms) earlier. For example, an uplink grant transmitted to the user device 102 provides a grant for the device 102 to transmit in a subframe that is 4 subframes after the uplink grant is transmitted. Similarly, the user device 102 may be scheduled to transmit acknowledge/not acknowledge feedback during a subframe that is 4 subframes after a hybrid automatic repeat request (HARQ) is transmitted to the user device 102.

However, for satellite-based narrow-band communication, the resource manager 126 or a ground-based controller may configure frame timing based on the wireless connection 106. For example, the frame timing may include a delay, between a communication and responsive communication, which is based on an orbital height of the orbital satellite 104. The delay may be increased to account for an increased time between transmission and receipt of information over the wireless connection 106.

Radio signals travel near the speed of light (300 km/ms). Because land-based wireless connections are typically 35-70 km, a time of flight of a signal is a fraction of a subframe (1 ms interval). However, a low Earth orbital satellite may be 2,000 km from a nearest location on the surface of Earth. At this distance, a time of flight for a communication signal between the user device 102 and the orbital satellite 104 is nearly 7 ms, or 7 subframes. If the orbital satellite 104 operates as a repeater for a signal generated on Earth, the amount of time may double. A geostationary orbital satellite orbits at about 35,786 km from a nearest location on Earth.

At this height, the time of flight of the signal is over 119 ms, or 119 subframes. In order to compensate for the time of flight, the resource manager 126 or a ground-based controller may configure frame timing and associated delays. The configured frame timing, and associated delays, may be sent to the user device 102 as a static configuration or a dynamic configuration based on a distance between the user device 102 and the orbital satellite 104. In this way, the orbital satellite 104 may transmit, to the user device 102 an indication of a delay for responding to receiving data over the wireless connection.

Figure 2:
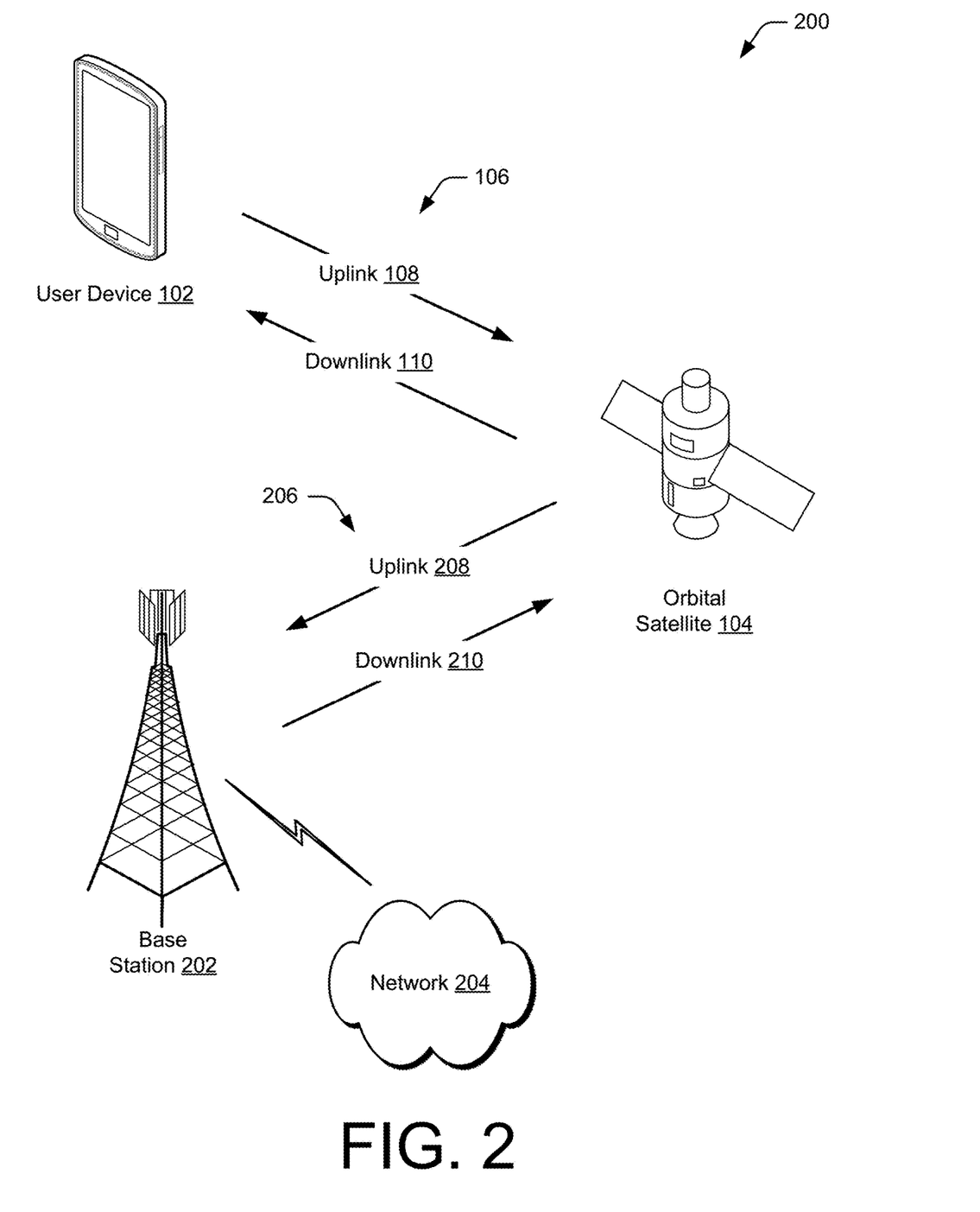
FIG. 2 illustrates an example networking environment in which the user device and the orbital satellite may communicate in accordance with one or more aspects of satellite-based narrow-band communication.

FIG. 2 illustrates an example networking environment 200 in which the user device 102 and the orbital satellite 104 may communicate in accordance with one or more aspects of satellite-based narrow-band communication. The network environment includes respective instances of the user device 102 and the orbital satellite 104, which enable the wireless connection 106 including the uplink 108 and the downlink 110. The networking environment 200 also includes a base station 202, through which the orbital satellite 104 may provide access to other networks or resources, such as a network 204 (e.g., the Internet) connected via a backhaul link (e.g., fiber network).

The base station 202 and the orbital satellite 104 communicate over a wireless connection 206 that includes an uplink 208 and a downlink 210. The wireless connection 206 utilizes a RAT that facilitates communication between the base station 202 and the orbital satellite 104, which may be similar to the connection 106 but may utilize a different frequency or may be a different RAT altogether. Additionally, the wireless connection 206 may be a full-band connection, as the base station 202 does not have the same power limitations as the user device 102. Furthermore, the wireless connection 206 may operate in a frequency range that provides a higher bandwidth than the wireless connection 106. For example, the wireless connection 206 may operate at a high-frequency band, such as the C-band, that is a higher frequency than that of the wireless connection 106 such that data may be communicated over the wireless connection 206 on high-frequency signals. This way, the wireless connection 206 may support relaying of data transferred over the wireless connection 106 and one or more other wireless connections between the orbital satellite 104 and other user devices. For example, the wireless connection 206 may operate in one of the C-band, X-band, K-band, V-band, W-band, or mm-band.

Alternatively, the orbital satellite 104 may act as a repeater for communication between the user device 102 and the base station 202. For example, the base station 202 provides data to the orbital satellite 104 via the downlink 210. The orbital satellite redirects and amplifies signals carrying the data to the user device 102 via the downlink 110. If the wireless connections 206 and 106 operate using different communication protocols, the orbital satellite 104 may also translate the data from the protocol of the wireless connection 206 to the protocol of the wireless connection 106.

Figure 3:
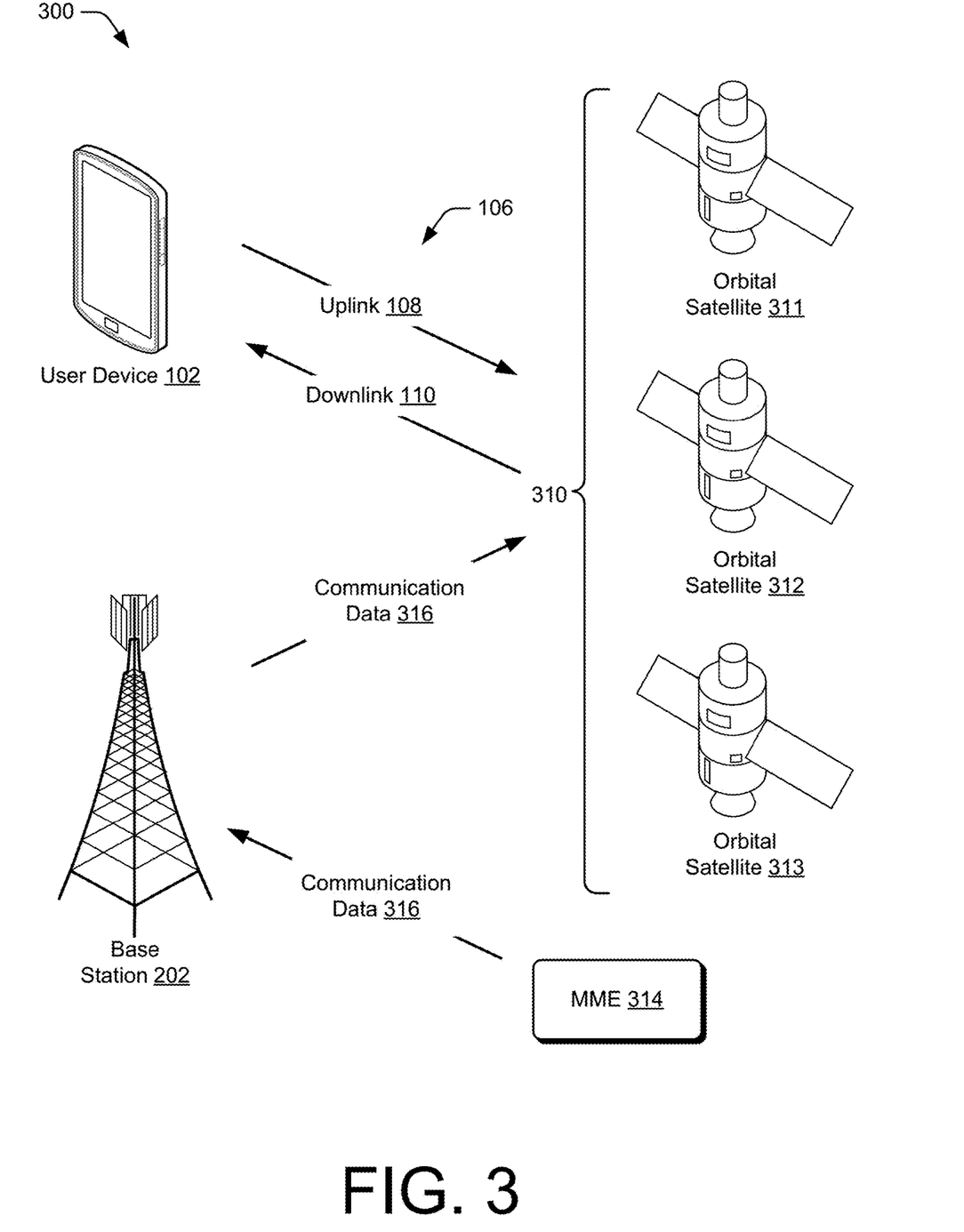
FIG. 3 illustrates another example networking environment in which the user device and a system of orbital satellites may communicate in accordance with one or more aspects of satellite-based narrow-band communication.

FIG. 3 illustrates an example networking environment 300 in which the user device and a system of orbital satellites communicate in accordance with one or more aspects of satellite-based narrow-band communication. The network environment 300 includes an instance of the user device 102 and a system 310 of orbital satellites 311, 312, and 313, which provide the wireless connection 106 including the uplink 108 and the downlink 110. Orbital satellites 311, 312, and 313 may be instances of orbital satellite 104. The networking environment 300 also includes an instance of the base station 202, through which a mobility management entity (MME) 314 can send communication data 316 to manage the orbital satellites 311, 312, and 313 to provide the wireless connection 106.

The communication data 316 may include hand-off instructions as one orbital satellite (311, 312, or 313) moves out of range of the user device 102 and another orbital satellite (311, 312, or 313) moves into range of the user device 102. Additionally or alternatively, the communication data 316 may include instructions to control one or more of the wireless connections 206 or 106. In particular, the communication data may include resource management commands to be implemented by the resource manager 126 to control a resource allocation for the wireless connection 106. In some implementations, the MME 314 manages two or more of the orbital satellites 311, 312, and 313 to provide a phased array to improve a range or signal quality of the wireless connection 106.

Figure 4:
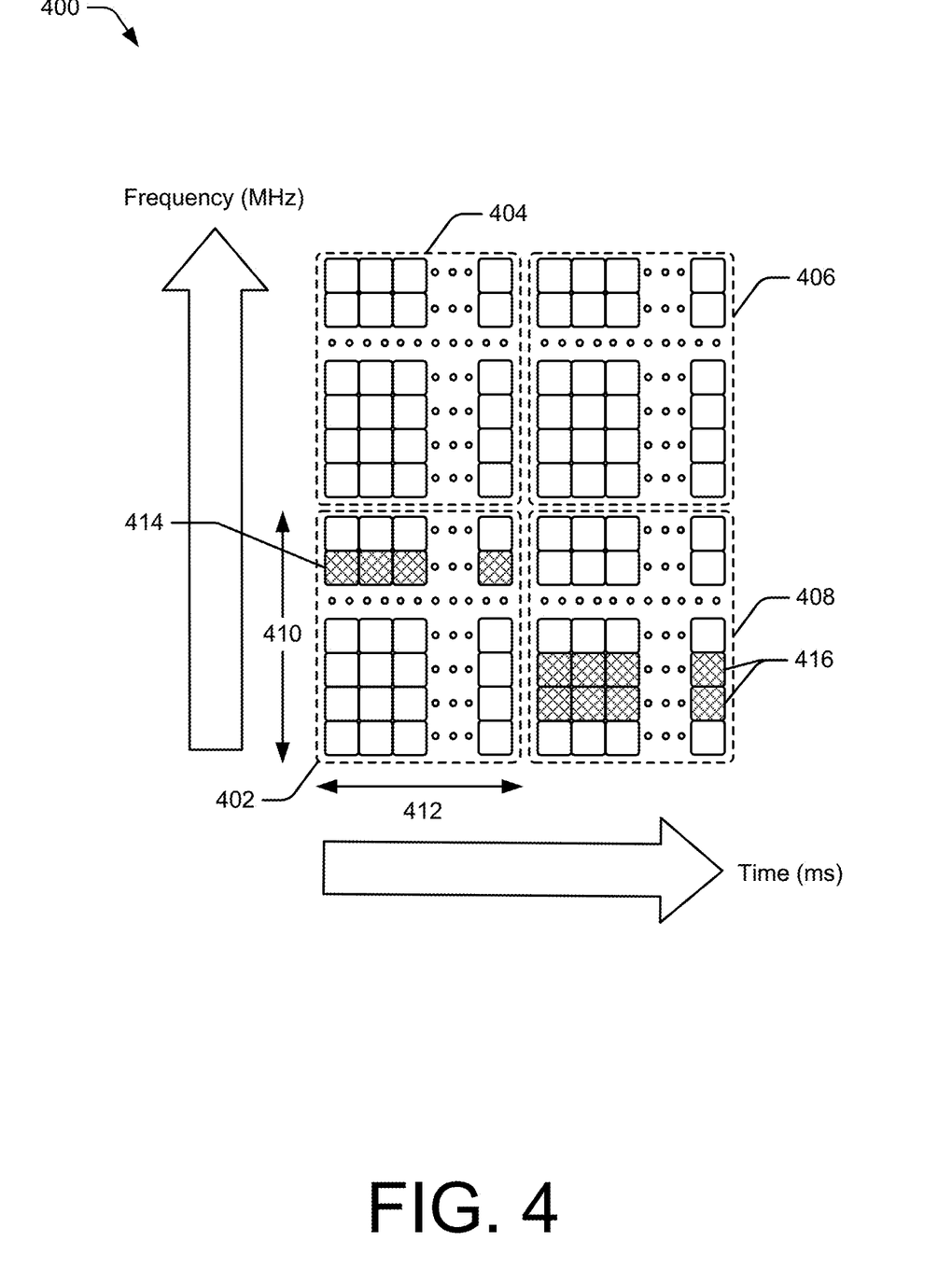
FIG. 4 illustrates an example set of resource blocks available for communication with one or more user devices.

FIG. 4 illustrates an example set 400 of resource blocks available to one or more of the orbital satellite 104 or the base station 202 for communication with one or more user devices of a wireless network. The set 400 of resource blocks includes a first resource block 402, a second resource block 404, a third resource block 406, and a fourth resource block 408. The wireless communication resource block 402, as defined by a communication protocol or standard, spans a specified frequency range 410 and a specified time interval 412. For example, each resource block 402, 404, 406, and 408 may span approximately 180 KHz of bandwidth and a time slot of approximately one-half millisecond or 7 OFDM symbols.

In some aspects of satellite-based narrow-band communication, the resource manager 126 of the orbital satellite 104 may determine a quantity of resource elements (or subcarriers) of one or more of the resource blocks 402, 404, 406, or 408 to allocate to the user device 102 for satellite-based narrow-band communication. The resource manager 126 may allocate a same quantity of resource elements for narrow-band communication with multiple user devices over multiple wireless connections. For example, based on a distance between the orbital satellite 104 and Earth (orbital height), the resource manager 126 may determine to allocate two subcarriers of respective resource blocks for communication with each of the multiple user devices.

Additionally or alternatively, based on optimization algorithms that may be implemented by the resource manager 126, the resource manager 126 may determine a quantity of resource elements or subcarriers of the resource blocks 402, 404, 406, and 408 to allocate for communicating with the user device 102 or other user devices. The optimization algorithms may be based at least in part on one or more of a signal quality of the wireless connection 106, a distance between the user device 102 and the orbital satellite 104, or a distance between the orbital satellite 104 and Earth.

The fewer resource elements that are allocated, the longer the range capabilities of the wireless connection 106 based on a power spectral density of signals sent via the allocated resource elements. However, with fewer resource elements allocated, a bandwidth of the wireless connection 106 decreases. Based on the determined quantity, the resource manager 126 can select resource elements from one or more of the resource blocks 402, 404, 406, or 408 for communicating with the user device 102. For example, the resource manager 126 may select a portion, but not all, of the resource block 402, such as a subcarrier 414 of the resource block 402, or a subcarrier 416 of the resource block 408, for satellite-based narrow-band communication.

Figure 5:
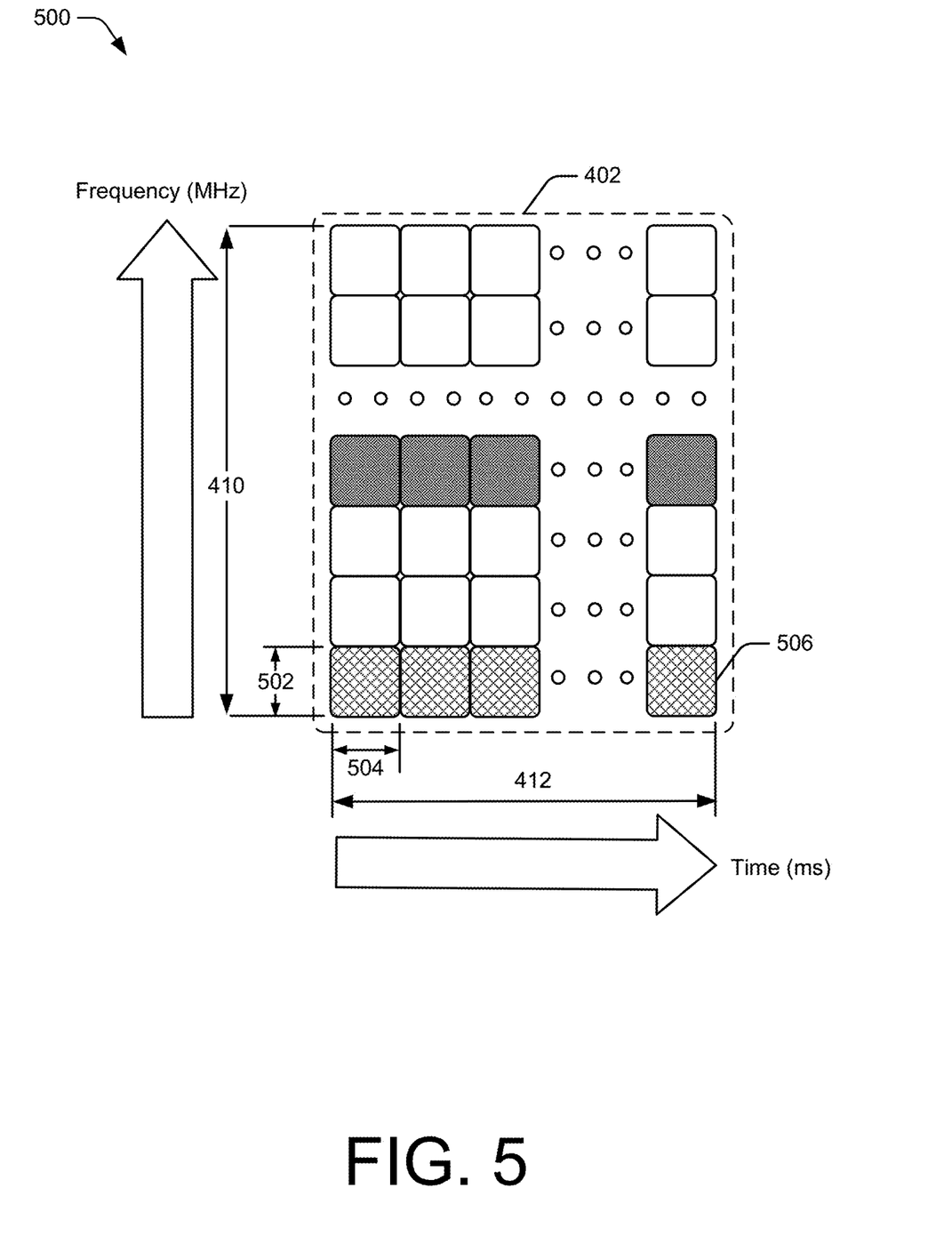
FIG. 5 illustrates a detailed example of a resource block that may be implemented as one of the resource blocks of FIG. 4.

FIG. 5 illustrates a detailed example 500 of the resource block 402 as shown in FIG. 4. In this example, the resource block 402 includes a plurality of subcarriers that each span a portion of the specified frequency range 410. For example, a subcarrier may span a 15 kHz portion 502 of the specified frequency range 410 (e.g., 180 kHz) of the resource block 402. Each subcarrier is divided into a plurality of resource elements (illustrated as blocks), that correspond to a symbol or subinterval 504 of the specified time interval 412. For example, a resource element 506 of the subcarrier spanning the portion 502 of the specified frequency range 410 may correspond to a last subinterval or symbol of the specified time interval 412 or time slot of the resource block 402.

In accordance with various aspects of satellite-based narrow-band communication, the resource manager 126 of the orbital satellite 104 may select subcarriers or resource elements of the resource block 402 on a granular level by which the user device 102 can communicate in a narrow-band mode. The resource manager 126 may select one or a few, but not all, subcarriers of the resource block 402 for satellite-based narrow-band communication. For example, the resource manager 126 may select one subcarrier of 15 kHz for use in narrow-band communication, instead of a wide-band frequency allocation of an entire resource block (e.g., 180 kHz) or multiple resource blocks (e.g., 1 GHz).

Figure 6:
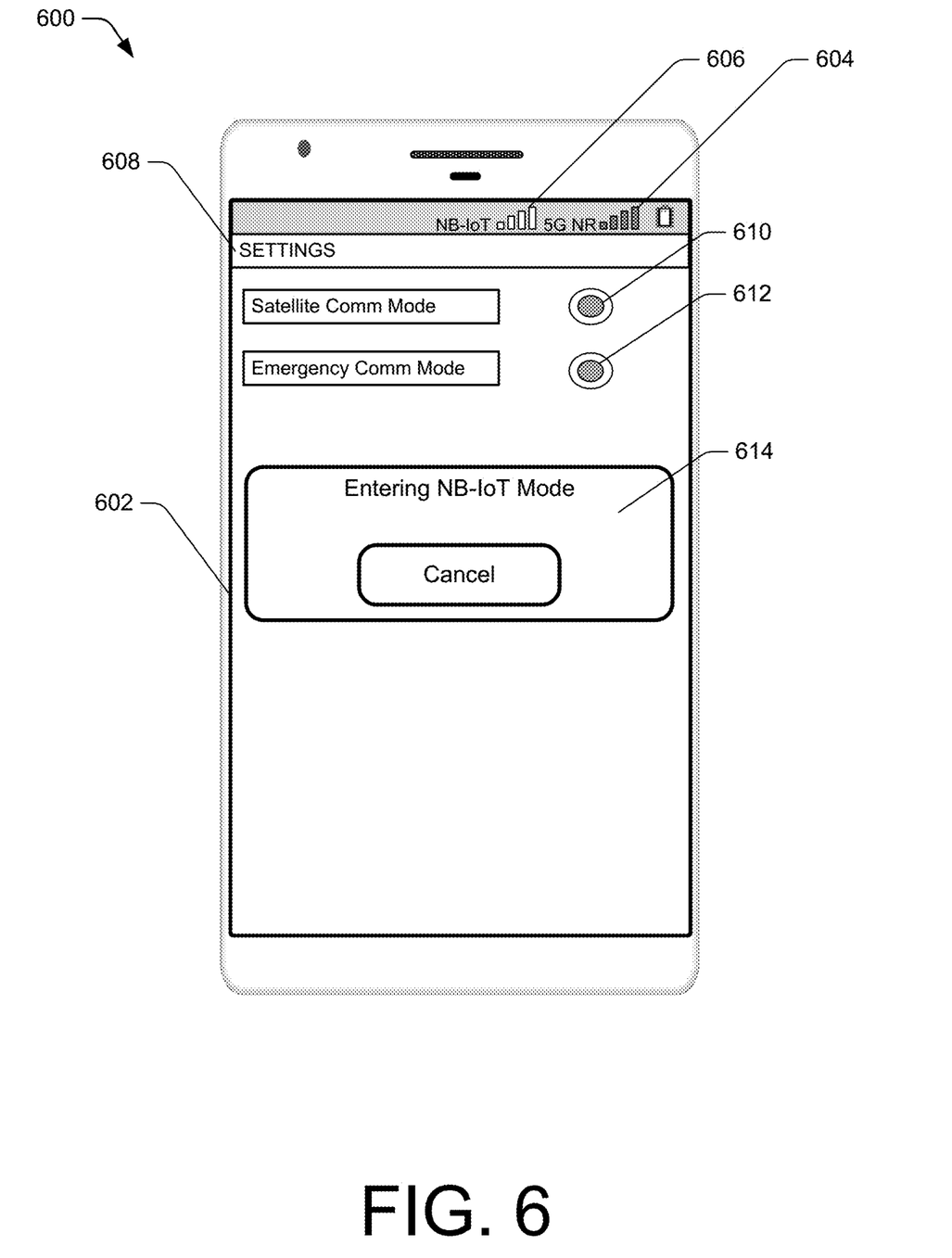
FIG. 6 illustrates an example user interface of a user device through which one or more aspects of satellite-based narrow-band communication can be implemented.

FIG. 6 illustrates an example user interface 600 of a user device through which one or more aspects of satellite-based narrow-band communication can be implemented. In this example, the user interface 600 is presented through a visible portion of a display 602. The display 602 may also include, or be integrated with, a touch screen or touch-sensitive overlay for receiving touch input from the user. The display 602 may also display a signal-quality indicator 604 of a first wireless connection (shown as 5G NR) and a signal-quality indicator 606 of a second wireless connection (shown as NB-IoT). In this example, the signal-quality indicator 604 indicates that the first wireless connection is unavailable, while the signal-quality indicator 606 indicates that the second wireless connection is available.

In some cases, the display 602 provides, or makes accessible, a settings menu 608 through which the user interface 600 can receive an input 610 to select a satellite communication mode or an input 612 to select an emergency communication mode. The input 610 and 612 can be effective to cause the user device 102 to establish a wireless connection with a satellite-based NB-IoT network.

The user device 102 may provide a notification 614 via the user interface 600 to indicate that the user device 102 is entering the NB-IoT mode. The notification 614 is illustrated in this example as a pop-up notification in the display 602, however, other forms of notification 614 may be implemented. For example, alternatively or in addition to the pop-up notification, the user device 102 may provide an audible notification, a visible notification via a light emitting diode (LED) indicator that is separate from the display 602, or a motion-based notification such as a vibration of the user device 102.

The user interface 600 is but one of many possible user interfaces for implementing satellite-based narrow-band communication. Although the user device 102 is illustrated as a smart phone with a touch screen, alternative user interfaces may be implemented by the user device 102. For example, the user device 102 may be implemented as a laptop with a user interface including, for example, one or more of a mouse, a track pad, a keyboard, a microphone, a monitor, a projector screen, or speakers. In some implementations, the user interface does not require accessing the settings menu 608 for receiving the inputs 608 or 610, but rather, the user device 102 enters the NB-IoT mode automatically and without receiving user input.

Techniques for Satellite-Based Narrow-Band Communication

Example methods 700 and 800 are described with reference to FIGS. 7 and 8 in accordance with one or more aspects of satellite-based narrow-band communication. The order in which the method blocks are described are not intended to be construed as a limitation, and any number of the described method blocks can be combined in any order or skipped to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
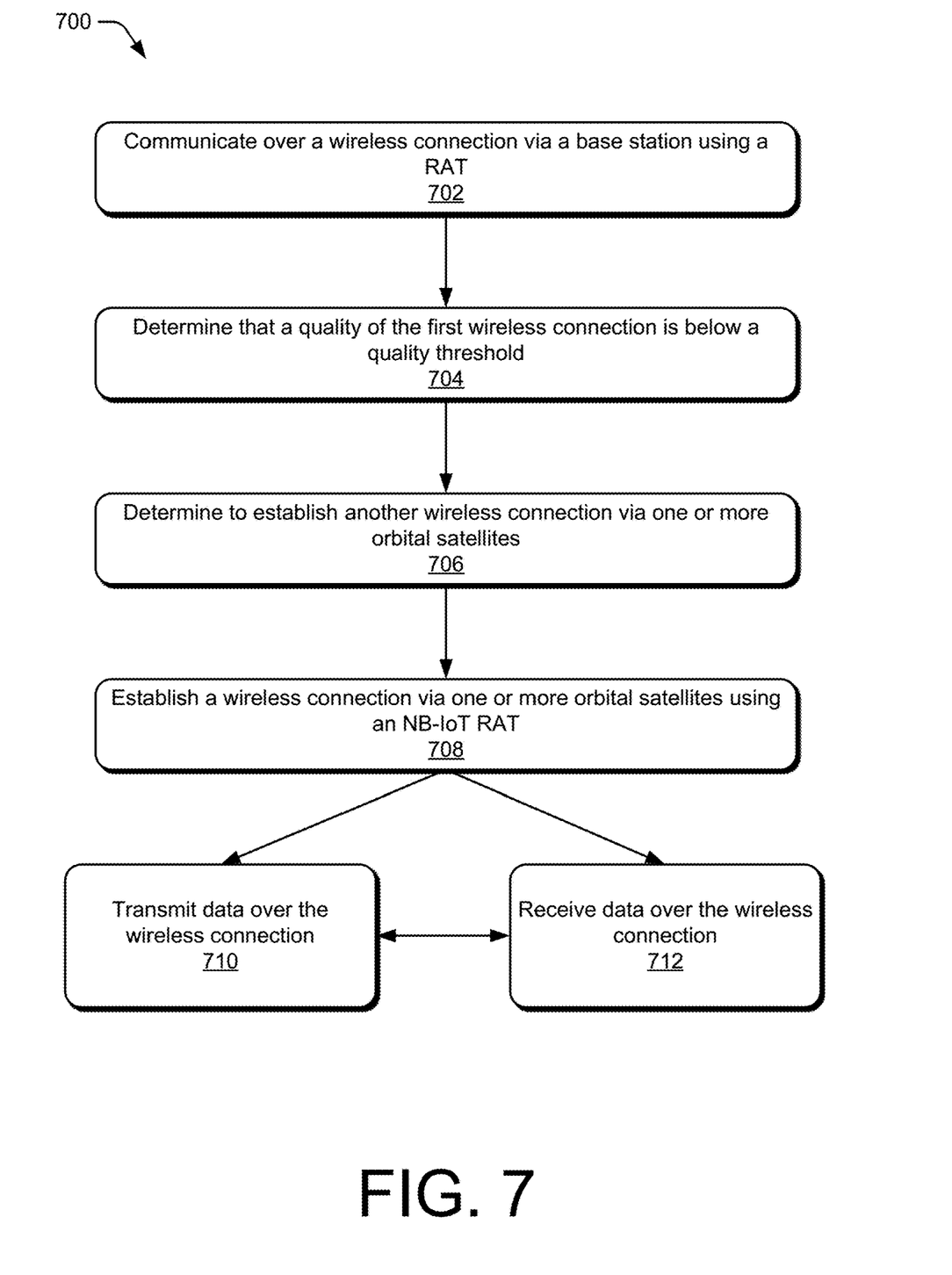
FIG. 7 illustrates an example method for satellite-based narrow-band communication.
Figure 8:
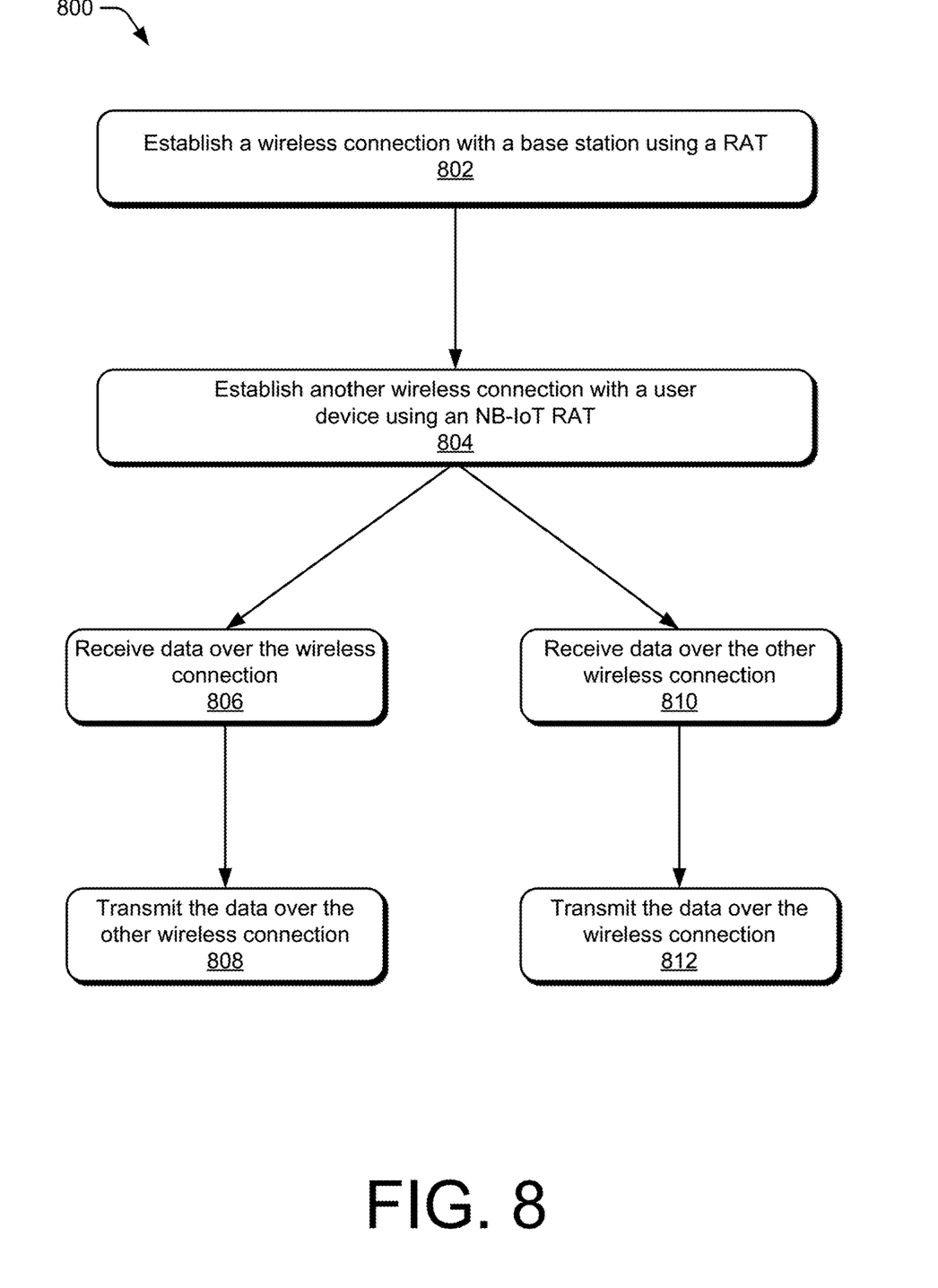
FIG. 8 illustrates another example method for satellite-based narrow-band communication.

FIGS. 7 and 8 depict methods for implementing satellite-based narrow-band communication. These methods are shown as sets of blocks that specify operations performed but are not necessarily limited to the order or combinations shown for performing the operations by the respective blocks. For example, operations of different methods may be combined, in any order, to implement alternate methods without departing from the concepts described herein. In portions of the following discussion, the techniques may be described in reference to FIGS. 1-6, reference to which is made for example only. The techniques are not limited to performance by one entity or multiple entities operating on one device, or those described in these figures.

FIG. 7 illustrates an example method 700 for satellite-based narrow-band communication, including operations performed by a wireless connection manager, such as the wireless connection manager 116, and a communication module, such as the communication module 120 of the user device 102. In some aspects, operations of the method 700 may be implemented to allow wireless communication without reliance on availability of a wireless network provided by nearby base station.

At optional operation 702, a user device communicates over a wireless connection via a base station using a RAT. For example, the user device 102 communicates, via a transceiver of the communication module 120, with a base station. The user device 102 may communicate with a base station using a RAT such as 4G LTE, LTE Advanced, or 5G NR. The base station facilitating the wireless connection is a ground-based base station such as a Global System for Mobile Communications (GSM) base station, a node base (Node B) transceiver station (e.g., for universal mobile telecommunications systems), an evolved NodeB (eNB, e.g., for LTE), or a next generation Node B (gNB, e.g., for 5G NR).

At optional operation 704, the user device determines that a quality of the first wireless connection is below a quality threshold. For example, the user device 102 determines that it is out of range of the wireless connection. At optional operation 706, the user device determines to establish another wireless connection via one or more orbital satellites. This determination may be made by wireless connection manager 116 based on detecting that the NB-IoT-based wireless connection is available. Additionally or alternatively, the user device 102 may receive input requesting the wireless connection manager 116 enter the NB-IoT mode.

At operation 708, the user device establishes, via a transceiver of the user device, a wireless connection via one or more orbital satellites. The wireless connection may use an NB-IoT RAT. For example, the user device 102 establishes the wireless connection 106 with the orbital satellite 104 or the system 310 of orbital satellites 311, 312, and 313.

At optional operation 710, the user device communicates, via a transmitter of the transceiver of the user device, over the wireless connection by transmitting data to the orbital satellite. For example, the user device 102 transmits data via the uplink 108 to the orbital satellite 104. The orbital satellite 104 may then transmit the data to the base station 202, which provides access to the network 204.

At optional operation 712 the user device communicates, via a receiver of the transceiver of the user device, over the wireless connection by receiving data from the orbital satellite. For example, the user device 102 receives data via the downlink 110 from the orbital satellite 104. The orbital satellite 104 may have received the data from the base station 202, which in turn received the data from the network 204.

FIG. 8 illustrates an example method 800 for satellite-based narrow-band communication, including operations performed by a resource manager of an orbital satellite, such as the resource manager 126 of the orbital satellite 104 or an MME, such as the MME 314, and a communication module, such as the communication module 128 of the orbital satellite 104. In some aspects, operations of the method 800 may be implemented to allow wireless communication without reliance on availability of a wireless network provided by base station near a user device.

At optional operation 802, an orbital satellite establishes, via a transceiver of the orbital satellite, a wireless connection with a base station using a first RAT. For example, the orbital satellite 104 establishes the wireless connection 206 with the base station 202. The RAT of the first wireless connection may be any suitable RAT that allows for communication of data at a distance between the base station 202 and the orbital satellite 104. The wireless connection may be implemented to operate at a frequency that provides a high bandwidth that supports communication between the orbital satellite and several user devices.

At operation 804, the orbital satellite establishes, via a transceiver of the orbital satellite, another wireless connection use a user device using an NB-IoT RAT. For example, the orbital satellite 104 establishes the wireless connection 106 with the user device 102 using an NB-IoT RAT. In some implementations, the transceiver used to establish the other wireless connection with the user device is different from the transceiver used to establish the wireless connection with the base station, as described in operation 802. However, multiple sets of unique hardware having a unique receiver and transmitter may be collectively referred to as the transceiver of the orbital satellite.

At optional operation 806, the orbital satellite receives data over the wireless connection. At optional operation 808, the orbital satellite transmits, via a transmitter of the orbital satellite, the data over the other wireless connection to the user device. For example, the orbital satellite 104 receives the data over the downlink 210 of the wireless connection 206. The orbital satellite 104 then transmits the data over the downlink 110 of the wireless connection 106 to the user device 102. As described, the orbital satellite 104 may translate, amplify, and redirect signals carrying the data over the wireless connection 206 to transmit the data over the wireless connection 106.

At optional operation 810, the orbital satellite receives data over the other wireless connection. At optional operation 812, the orbital satellite transmits, via a transmitter of the orbital satellite, the data over the wireless connection to the base station. For example, the orbital satellite 104 receives the data over the uplink 108 of the wireless connection 106. The orbital satellite 104 then transmits the data over the uplink 208 of the wireless connection 206 to the base station 202. As described, the orbital satellite 104 may translate, amplify, and redirect signals carrying the data over the wireless connection 106 to transmit the data over the wireless connection 206.

Although techniques using, and apparatuses for, satellite-based narrow-band communication have been described in language specific to features and methods, it is to be understood that the subject of the appended claims is not necessarily limited to the specific features or methods described. Rather, the specific features and methods are disclosed as example ways in which satellite-based narrow-band communication can be implemented.

What is claimed is:

1. A method of low-bandwidth high-range communication performed by a user device, the method comprising:
   determining, by the user device, that a quality of a first wireless connection with a base station using a first radio access technology (RAT) is below a quality threshold;
   responsive to determining that the first wireless connection is below the quality threshold, establishing, via a transceiver of the user device, a second wireless connection with a satellite using a second RAT comprising a narrow-band Internet-of-Things (NB-IoT) RAT;
   allocating a quantity of resource elements or subcarriers to the second wireless connection, the quantity of resource elements or subcarriers based on a distance between the user device and the satellite or a distance between Earth and the satellite; and
   communicating, via the transceiver of the user device, data between the satellite and the user device using the second wireless connection, the communicating comprising:
   transmitting, via a transmitter of the transceiver of the user device, the data over the second wireless connection using the NB-IoT RAT; or
   receiving, via a receiver of the transceiver of the user device, the data over the second wireless connection using the NB-IoT RAT.

2. The method as recited in claim 1, wherein the determination that the quality of the first wireless connection is below the quality threshold comprises receiving an indication of a null-quality first wireless connection.

3. The method as recited in claim 1, further comprising, prior to determining that the first wireless connection is below the quality threshold, communicating, via the transceiver of the user device, with the base station using the first RAT.

4. The method as recited in claim 1, wherein the communicating further comprises:

receiving delay data indicating an amount of delay for transmission by the user device over the second wireless connection.

5. The method as recited in claim 1, wherein the communicating further comprises:
receiving an uplink grant or a hybrid automatic repeat request.

6. The method as recited in claim 1, wherein the data comprises an emergency broadcast message.

7. The method as recited in claim 1, wherein the first wireless connection and the second wireless connection are co-banded.

8. The method as recited in claim 7, wherein the first wireless connection and the second wireless connection operate in an L-band, an S-band, or a C-band.

9. The method as recited in claim 1, wherein the quantity of resources or subcarriers comprise less than a quantity of resources or subcarriers of one resource block.

10. A user device comprising:
a processor;
a transceiver configured to communicate using a plurality of radio access technologies (RATs); and
a non-transitory computer-readable storage medium having stored thereon instructions that, responsive to execution by the processor, cause the processor to perform operations comprising:
determining that a quality of a first wireless connection with a base station using a first RAT is below a quality threshold;
responsive to determining that the first wireless connection is below the quality threshold, establishing, via the transceiver, a second wireless connection with a satellite using a second RAT comprising a narrow-band Internet-of-Things (NB-IoT) RAT;
allocating a quantity of resource elements or subcarriers to the second wireless connection, the quantity of resource elements or subcarriers based on a distance between the user device and the satellite or a distance between Earth and the satellite; and
communicating, via the transceiver, data between the satellite and the user device via the second wireless connection using the NB RAT IoT RAT.

11. The user device as recited in claim 10, wherein the satellite is in low Earth orbit.

12. The user device as recited in claim 10, wherein the transceiver is configurable to communicate other data via the first RAT.

13. The user device as recited in claim 10, wherein the first RAT comprises a $4^{th}$ generation long term evolution (4G LTE) RAT, a 4G LTE advanced RAT, or a 5th generation new radio (5G NR) RAT.

14. The user device as recited in claim 10, wherein the data comprises an emergency broadcast message.

15. A method performed by a satellite, the method comprising:
establishing, via a transceiver of the satellite, a narrow-band Internet-of-Things (NB-IoT) radio access technology (RAT) wireless connection with a user device;
allocating a quantity of resource elements or subcarriers to the NB-IoT RAT, the quantity of resource elements or subcarriers based on a distance between the user device and the satellite or a distance between Earth and the satellite; and
communicating, via the transceiver of the satellite, data with the user device using the NB-IoT RAT, the communicating comprising:
transmitting, via a transmitter of the transceiver, the data using the NB-IoT RAT, the transmission combining with beams from other satellites to create a formed beam; or
receiving, via a receiver of the transceiver, the data using the NB-IoT RAT.

16. The method as recited in claim 15, wherein the data comprises an emergency broadcast message.

17. The method as recited in claim 15, wherein the satellite includes a repeater for transmitting or receiving the data to or from the base station.

18. The method as recited in claim 17, wherein the data is received from the base station, via the repeater, prior to transmitting the data to the user device; and
wherein the data is transmitted to the base station, via the repeater, after receiving the data from the user device.

19. The method as recited in claim 18, wherein the repeater utilizes another RAT that is different from the NB-IoT RAT.

20. The method as recited in claim 19, wherein the other RAT uses a frequency that is higher than that of the NB-IoT RAT.

* * * * *

UNITED STATES PATENT AND TRADEMARK OFFICE
CERTIFICATE OF CORRECTION

PATENT NO. : 10,700,769 B2  
APPLICATION NO. : 16/142952  
DATED : June 30, 2020  
INVENTOR(S) : Jibing Wang, Erik Richard Stauffer and Aamir Akram Page 1 of 1

It is certified that error appears in the above-identified patent and that said Letters Patent is hereby corrected as shown below:

In the Claims

Column 15, Line 42, after "the" before "RAT." delete "NB RAT IoT" insert --NB-IoT--

Signed and Sealed this
Eighteenth Day of August, 2020

Andrei Iancu
*Director of the United States Patent and Trademark Office*